United States Patent
Fukuoka et al.

(10) Patent No.: US 10,785,527 B2
(45) Date of Patent: Sep. 22, 2020

(54) DYNAMIC ALLOCATION OF WIRELESS PERSONAL AREA NETWORK RADIOS AMONG A PLURALITY OF RADIO ACCESS TECHNOLOGIES SUPPORTED BY A USER EQUIPMENT

(71) Applicant: QUALCOMM Incorporated, San Diego, CA (US)

(72) Inventors: Yoshiro Fukuoka, Solana Beach, CA (US); Anssi Haverinen, San Diego, CA (US); Le Luong, San Diego, CA (US); Paul Denboer, Escondido, CA (US); Huibert Denboer, Escondido, CA (US); Joel Linsky, San Diego, CA (US); Thomas Cargill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 15/640,405

(22) Filed: Jun. 30, 2017

(65) Prior Publication Data

US 2019/0007730 A1    Jan. 3, 2019

(51) Int. Cl.
| | | |
|---|---|---|
| *H04N 21/436* | (2011.01) | |
| *H04W 88/06* | (2009.01) | |
| *H04N 21/4363* | (2011.01) | |
| *H04W 16/02* | (2009.01) | |
| *H04W 56/00* | (2009.01) | |
| *H04W 72/04* | (2009.01) | |

(52) U.S. Cl.
CPC . *H04N 21/43615* (2013.01); *H04N 21/43637* (2013.01); *H04W 16/02* (2013.01); *H04W 56/0015* (2013.01); *H04W 72/042* (2013.01); *H04W 72/0413* (2013.01); *H04W 72/0446* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 9,596,693 B2 | 3/2017 | Truong et al. | |
| 2007/0165757 A1* | 7/2007 | Heiman | H04B 7/0854 375/347 |
| 2008/0253351 A1 | 10/2008 | Pernu et al. | |

(Continued)

FOREIGN PATENT DOCUMENTS

| | | |
|---|---|---|
| EP | 1732273 A1 | 12/2006 |
| IN | 185CHE2015 A | 7/2016 |
| WO | 2012168256 A1 | 12/2012 |

OTHER PUBLICATIONS

Zheng et al, Diversity and Multiplexing: A Fundamental Tradeoff in Multiple-Antenna Channels, IEEE (Year: 2003).*

(Continued)

*Primary Examiner* — Yaotang Wang
(74) *Attorney, Agent, or Firm* — Muncy, Geissler, Olds & Lowe

(57) ABSTRACT

In an embodiment, a user equipment (UE) is configured to operate in accordance with different wireless personal area network (WPAN) radio access technologies (RATs). The UE prioritizes a plurality of WPAN RATs supported by the UE, and dynamically allocates a plurality of shared WPAN radios to the plurality of WPAN RATs based on the prioritization.

60 Claims, 10 Drawing Sheets

(56) References Cited

U.S. PATENT DOCUMENTS

| | | | |
|---|---|---|---|
| 2009/0180451 A1* | 7/2009 | Alpert | H04W 72/1215 370/338 |
| 2012/0309440 A1* | 12/2012 | Orjmark | H04W 72/1215 455/509 |
| 2014/0301493 A1* | 10/2014 | Govindswamy | H04B 7/0817 375/267 |
| 2014/0328243 A1* | 11/2014 | Etemad | H04W 76/28 370/312 |
| 2015/0043493 A1 | 2/2015 | Gajanan et al. | |
| 2015/0092709 A1 | 4/2015 | Su | |
| 2016/0210578 A1 | 7/2016 | Raleigh et al. | |

OTHER PUBLICATIONS

International Search Report and Written Opinion—PCT/US2018/034873—ISA/EPO—dated Aug. 30, 2018.

* cited by examiner

DYNAMIC ALLOCATION OF WIRELESS PERSONAL AREA NETWORK RADIOS AMONG A PLURALITY OF RADIO ACCESS TECHNOLOGIES SUPPORTED BY A USER EQUIPMENT

BACKGROUND

1. Field of the Disclosure

Embodiments relate to dynamic allocation of wireless personal area network (WPAN) radios among a plurality of WPAN radio access technologies (RATs) supported by a user equipment (UE).

2. Description of the Related Art

Wireless Personal Area Networks (WPANs) are used for Device-to-Device (D2D) communication and are defined by IEEE 802.15. Different WPANs may be configured to use different Radio Access Technologies (RATs), including Bluetooth "classic", Bluetooth Low-Energy (BLE) (or Bluetooth Smart), Bluetooth Long-Range (BLR), Z-Wave, INSTEON, IrDA, Wireless USB, Body Area Network (e.g., comprised of wearable computing devices), and so on. Further, IEEE 802.15.4 defines standards for Low-Rate (LR) WPAN RATs, such as Zigbee, ISA100.11a, WirelessHART, MiWi, SNAP and Thread.

Certain user equipments (UEs), which may be referred to as "multimodal" UEs, may include wireless communications interfaces that support multiple WPAN RATs. Conventionally, UEs that support different multiple WPAN RATs include a dedicated WPAN radio assigned to each respective WPAN RAT. These dedicated WPAN radios are not shared between the different WPAN RATs.

SUMMARY

An embodiment is directed to a method of operating a user equipment (UE) that is configured to operate in accordance with different wireless personal area network (WPAN) radio access technologies (RATs), including prioritizing a plurality of WPAN RATs supported by the UE, and dynamically allocating a plurality of shared WPAN radios to the plurality of WPAN RATs based on the prioritizing.

Another embodiment is directed to a UE that is configured to operate in accordance with different WPAN RATs, including means for prioritizing a plurality of WPAN RATs supported by the UE, and means for dynamically allocating a plurality of shared WPAN radios to the plurality of WPAN RATs based on the prioritization.

Another embodiment is directed to a UE that is configured to operate in accordance with different WPAN RATs, including a memory, and at least one processor coupled to the memory and configured to prioritize a plurality of WPAN RATs supported by the UE, and dynamically allocate a plurality of shared WPAN radios to the plurality of WPAN RATs based on the prioritization.

Another embodiment is directed to a non-transitory computer-readable medium containing instructions stored thereon, which, when executed by a UE that is configured to operate in accordance with different WPAN RATs, causes the UE to perform operations, the instructions including at least one instruction configured to cause the UE to prioritize a plurality of WPAN RATs supported by the UE, and at least one instruction configured to cause the UE to dynamically allocate a plurality of shared WPAN radios to the plurality of WPAN RATs based on the prioritization.

BRIEF DESCRIPTION OF THE DRAWINGS

A more complete appreciation of embodiments of the disclosure will be readily obtained as the same becomes better understood by reference to the following detailed description when considered in connection with the accompanying drawings which are presented solely for illustration and not limitation of the disclosure, and in which.

DETAILED DESCRIPTION

Figure 1:
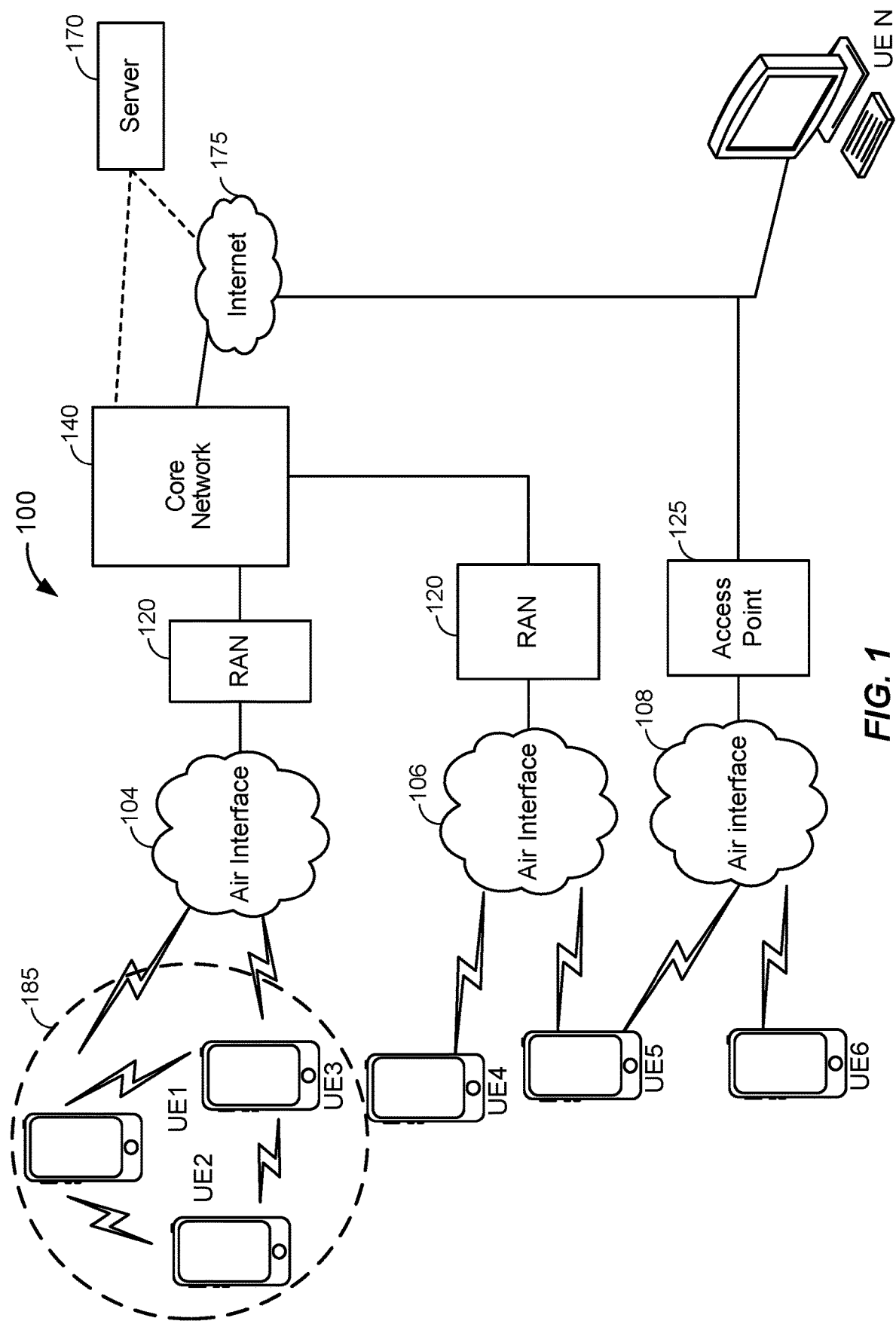
FIG. 1 illustrates a high-level system architecture of a wireless communications system in accordance with an embodiment of the disclosure.

Embodiments of the disclosure are directed to a prioritization scheme for a plurality of Wireless Personal Area Network (WPAN) Radio Access Technologies (RATs) supported by a user equipment (UE) that is used to dynamically allocate a shared plurality of WPAN radios among the plurality of WPAN RATs.

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter.

A client device, referred to herein as a UE, may be mobile or stationary, and may communicate with a wired access network and/or a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile device", a "mobile terminal", a "mobile station" and variations thereof. In an embodiment, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to cellular telephones, personal digital assistants (PDAs), pagers, laptop computers, desktop computers, PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a peer-to-peer (P2P) or device-to-device (D2D) channel.

FIG. 1 illustrates a high-level system architecture of a wireless communications system 100 in accordance with an embodiment of the disclosure. The wireless communications system 100 contains UEs 1 . . . N. For example, in FIG. 1, UEs 1 . . . 2 are illustrated as cellular calling phones, UEs 1 . . . 6 are illustrated as cellular touchscreen phones or smart phones, and UE N is illustrated as a desktop computer or PC.

Referring to FIG. 1, UEs 1 . . . N are configured to communicate with an access network (e.g., a RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, 4G LTE, 5G LTE, etc.), while the air interface 108 can comply with a wireless IP protocol (e.g., IEEE 802.11). The RAN 120 may include a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 may be configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175.

The Internet 175, in some examples, includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UEs 1 . . . N via the core network 140. Also shown in FIG. 1 is the access point 125 that is separate from the RAN 120. The access point 125 may be connected to the Internet 175 independent of the core network 140 (e.g., via an optical communications system such as FiOS, a cable modem, etc.). The air interface 108 may serve UE 5 or UE 6 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. The server 170 may correspond to any type of server, such as a web server (e.g., hosting a web page), an application download server, or an application server that supports particular communicative service(s), such as Voice-over-Internet Protocol (VoIP) sessions, Push-to-Talk (PTT) sessions, group communication sessions, a social networking service, etc.

Referring to FIG. 1, UEs 1 . . . 3 are depicted as part of a D2D network or D2D group 185, with UEs 1 and 3 being connected to the RAN 120 via the air interface 104. In an embodiment, UE 2 may also gain indirect access to the RAN 120 via mediation by UEs 1 and/or 3, whereby data 'hops' to/from UE 2 and one (or more) of UEs 1 and 3, which communicate with the RAN 120 on behalf of UE 2. The D2D group 185 may be supported via one or more WPAN RATs, as will be discussed below in more detail.

Figure 2:
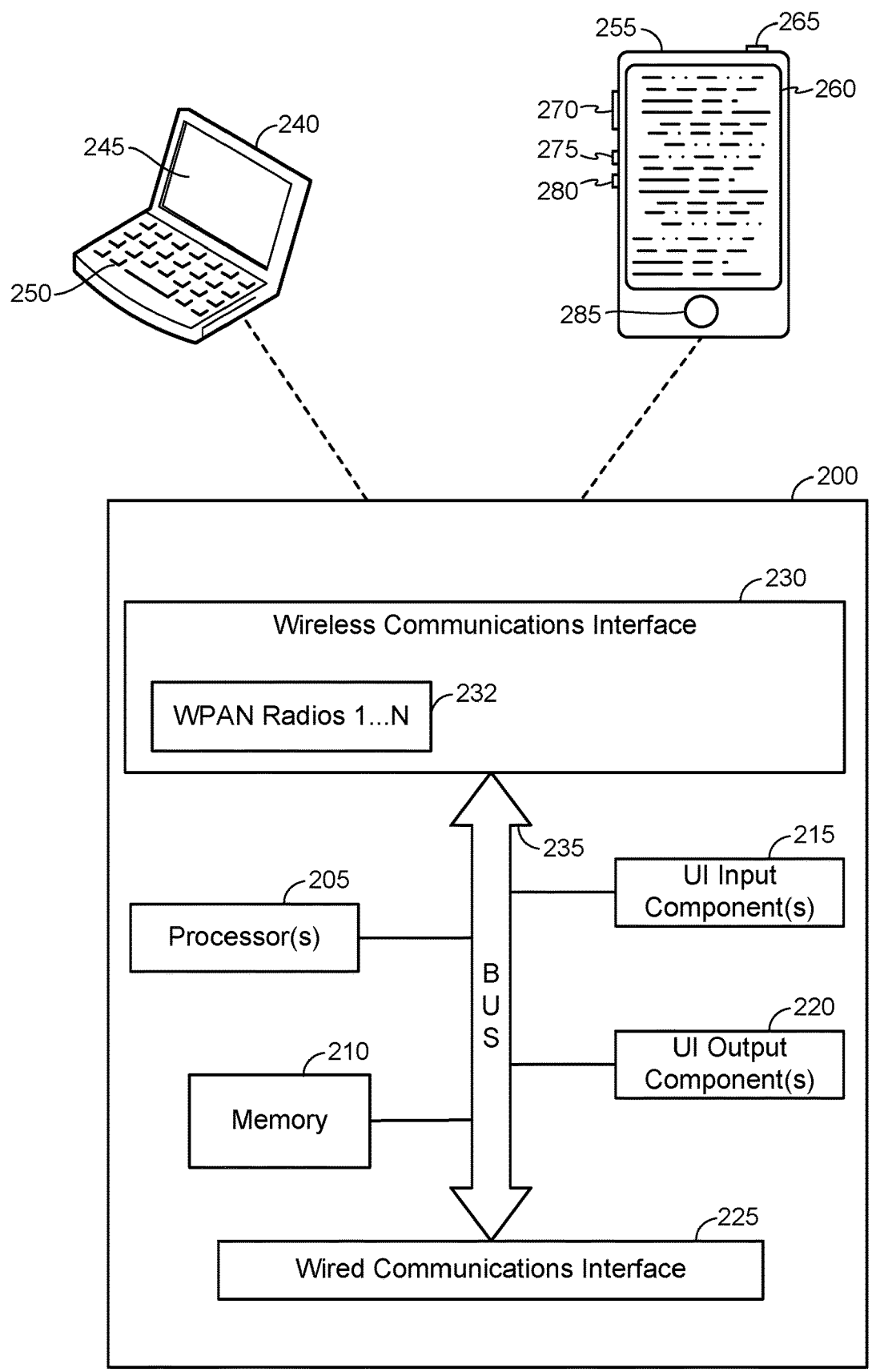
FIG. 2 illustrates a user equipment (UE) in accordance with an embodiment of the disclosure.

FIG. 2 illustrates a UE 200 in accordance with an embodiment of the disclosure. The UE 200 includes one or more processors 205 (e.g., one or more ASICs, one or more digital signal processors (DSPs), etc.) and a memory 210 (e.g., RAM, ROM, EEPROM, flash cards, or any memory common to computer platforms). The memory 210 may include content (e.g., media files that can be accessed via a media gallery application), as well as various applications (e.g., a media gallery application, a facial recognition module, a media capture or camera application, one or more messenger or call applications, a web browser, a navigation or mapping application, etc.) that are executable by the one or more processors 205 via an associated operating system. The UE 200 also includes one or more UI input components 215 (e.g., a keyboard and mouse, a touchscreen, a microphone, one or more buttons such as volume or power buttons, etc.) and one or more UI output components 220 (e.g., speakers, a display screen, a vibration device for vibrating the UE 200, etc.).

The UE 200 further includes a wired communications interface 225 and a wireless communications interface 230. In an example embodiment, the wired communications interface 225 can be used to support wired local connections to peripheral devices (e.g., a USB connection, a mini USB, Firewire or lightning connection, a headphone jack, graphics ports such as serial, VGA, HDMI, DVI or DisplayPort, audio ports, and so on) and/or to a wired access network (e.g., via an Ethernet cable or another type of cable that can function as a bridge to the wired access network such as HDMI v1.4 or higher, etc.). In another example embodiment, the wireless communications interface 230 includes one or more wireless transceivers for communication in accordance with a local wireless communications protocol (e.g., WLAN or WiFi, WiFi Direct, one or more WPAN RATs, LTE-D, Miracast, etc.). The wireless communications interface 230 may also include one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, or other protocols that may be used in a wireless communications network or a data communications network). The various components 205-230 of the UE 200 can communicate with each other via a bus 235. In the embodiment of FIG. 2, the wireless communications interface 230 includes a plurality of WPAN radios 1 . . . N 232 for supporting a plurality of different WPAN RATs, as will be discussed below in more detail with respect to FIGS. 3-4.

Referring to FIG. 2, the UE 200 may correspond to any type of UE, including but not limited to a smart phone, a laptop computer, a desktop computer, a tablet computer, a wearable device (e.g., a pedometer, a smart watch, etc.) and so on. Two particular implementation examples of the UE 200 are depicted in FIG. 2, which are illustrated as laptop 240 and touchscreen device 255 (e.g., a smart phone, a tablet computer, etc.). The laptop 240 includes a display screen 245 and a UI area 250 (e.g., keyboard, touchpad, power button, etc.), and while not shown the laptop 240 may include various ports as well as wired and/or wireless transceivers (e.g., Ethernet card, WiFi card, broadband card, satellite position system (SPS) antennas such as global positioning system (GPS) antennas, etc.).

The touchscreen device 255 is configured with a touchscreen display 260, peripheral buttons 265, 270, 275 and 280 (e.g., a power button, a volume or vibrate control button, an airplane mode toggle button, etc.), and at least one front-panel button 285 (e.g., a Home button, etc.), among other components, as is known in the art. While not shown explicitly as part of the touchscreen device 255, the touchscreen device 255 can include one or more external antennas and/or one or more integrated antennas that are built into the external casing of the touchscreen device 255, including but not limited to WiFi antennas, cellular antennas, SPS antennas (e.g., GPS antennas), and so on.

Certain user equipments (UEs), which may be referred to as "multimodal" UEs, may include wireless communications interfaces that support multiple WPAN RATs, including Bluetooth "classic", Bluetooth Low-Energy (BLE) (or Bluetooth Smart), Bluetooth Long-Range (BLR), Z-Wave, INSTEON, IrDA, Wireless USB, Body Area Network (e.g., comprised of wearable computing devices), and so on. Further, IEEE 802.15.4 defines standards for Low-Rate (LR) WPAN RATs, such as Zigbee, ISA100.11a, WirelessHART, MiWi, SNAP and Thread. Conventionally, UEs that support different multiple WPAN RATs include a dedicated WPAN radio assigned to each respective WPAN RAT, as discussed below with respect to FIG. 3.

Figure 3:
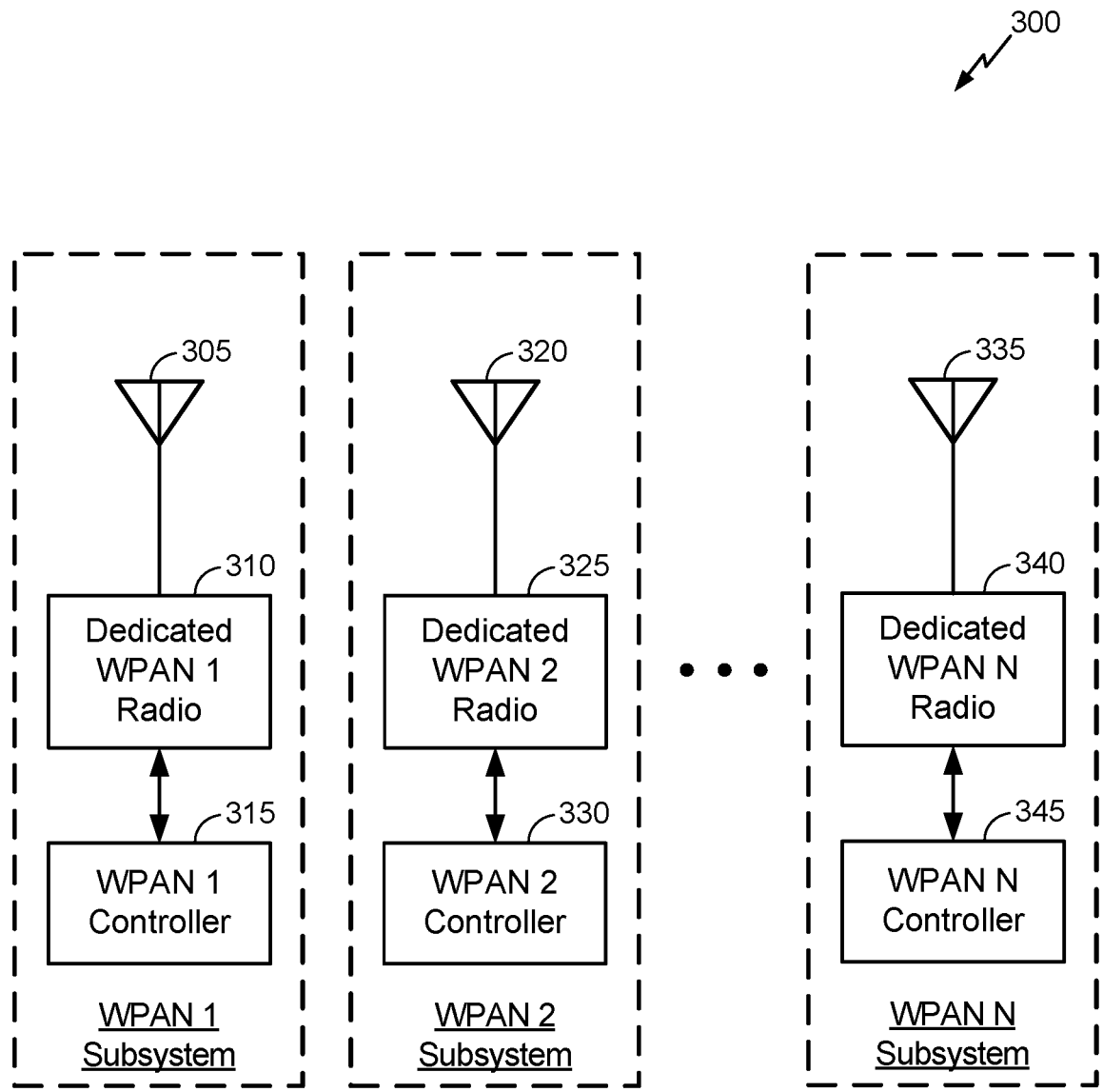
FIG. 3 illustrates a communications device that includes structural components in accordance with an embodiment of the disclosure.

FIG. 3 illustrates a conventional WPAN communications interface 300 for a multimodal UE. Referring to FIG. 3, the WPAN communications interface 300 includes subsystems for a plurality of different WPAN RATs. In particular, each distinct WPAN subsystem is denoted in FIG. 3 as WPAN 1 subsystem, WPAN 2 subsystem, . . . , WPAN N subsystem, and the plurality of different WPAN RAT are denoted in FIG. 3 as WPANs 1 . . . N. As used herein, N is an integer greater than or equal to 2 (e.g., if N=2, then WPAN N corresponds to WPAN 2 even though three distinct subsystems are depicted in FIG. 3). In an example, the WPAN communications interface 300 may correspond to a portion of the wireless communications interface 230 of FIG. 2.

Referring to FIG. 3, WPAN 1 subsystem includes an antenna 305, a dedicated WPAN 1 radio 310 and a WPAN 1 controller 315, WPAN 2 subsystem includes an antenna 320, a dedicated WPAN 2 radio 325 and a WPAN 2 controller 330, and WPAN 3 subsystem includes an antenna 335, a dedicated WPAN N radio 340 and a WPAN N controller 345. Each respective WPAN radio 310, 325, 340 is described as "dedicated" because each respective WPAN radio 310, 325, 340 is allocated to the particular WPAN RAT of its associated subsystem. So, WPAN 1 controller 315 allocates the dedicated WPAN 1 radio 310 to WPAN 1 only, WPAN 2 controller 330 allocates the dedicated WPAN 2 radio 325 to WPAN 2 only, and so on. The respective WPAN controllers 315, 330, 345 generally do not coordinate with each other and do not determine and/or consider relative priorities of different WPAN RATs.

Figure 4:
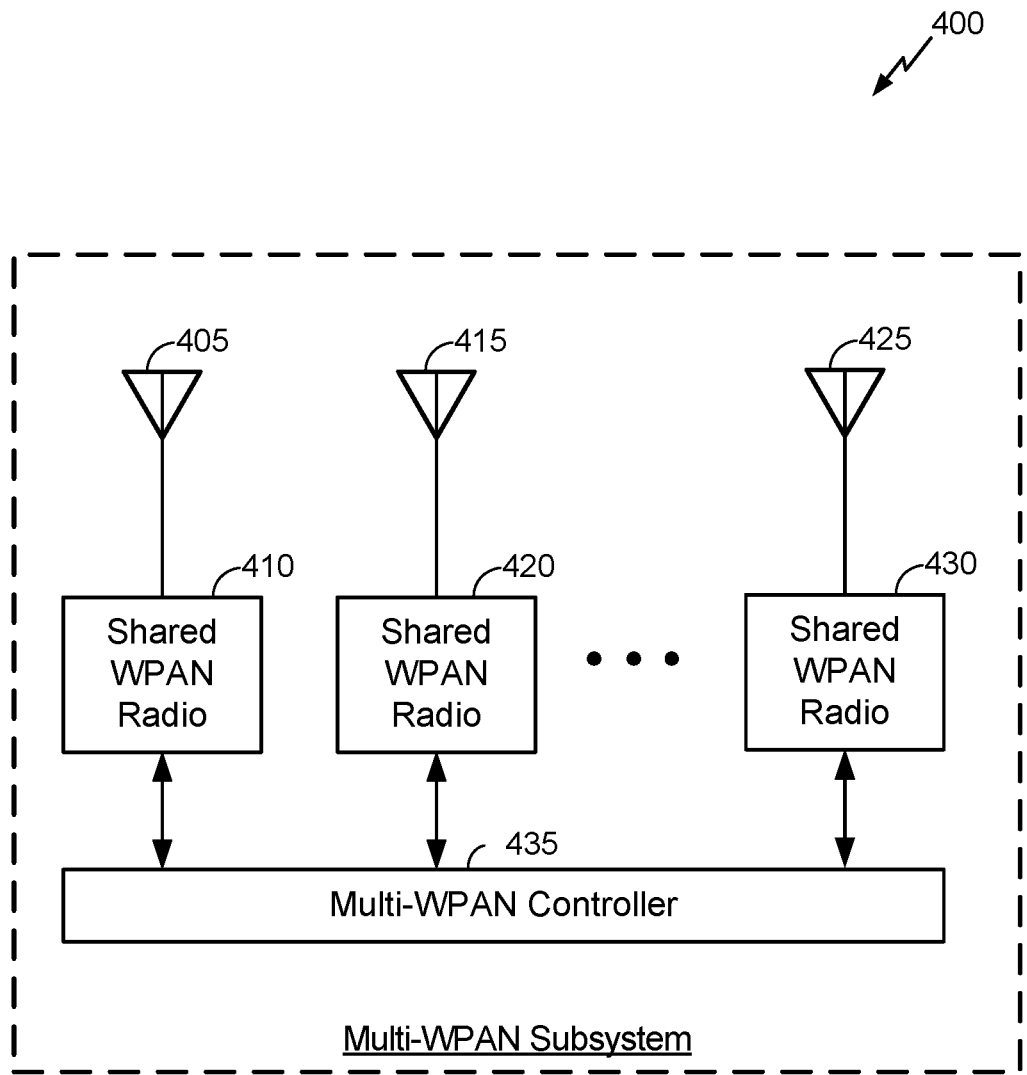
FIG. 4 illustrates a wireless personal area network (WPAN) communications interface for a multimodal UE in accordance with an embodiment of the disclosure.

FIG. 4 illustrates a WPAN communications interface 400 for a multimodal UE in accordance with an embodiment of the disclosure. In contrast to the compartmentalized, independent subsystems for the various WPAN RATs in FIG. 3, the WPAN communications interface 400 of FIG. 4 includes a multi-WPAN subsystem for a plurality of different WPAN RATs. In an example, the WPAN communications interface 300 may correspond to a portion of the wireless communications interface 230 of FIG. 2.

Referring to FIG. 4, the multi-WPAN subsystem includes an antenna 405 coupled to a $1^{st}$ shared WPAN radio 410, an antenna 415 coupled to a $2^{nd}$ shared WPAN radio 420, an antenna 425 coupled to an $N^{th}$ shared WPAN radio 430. As used herein, N is an integer greater than or equal to 2 (e.g., if N=2, then only two WPAN radios are used in the WPAN communications interface 400 despite three distinct WPAN radios being illustrated in FIG. 4). In an example, one shared WPAN radio may be allocated for each WPAN RAT supported by the multimodal UE. However, unlike FIG. 3, the respective WPAN radios are allocated to the WPAN RATs based at least in part upon prioritization, and are not dedicated to exclusive use by specific WPAN RATs at all times. Also, in other embodiments, the number of WPAN radios need not be equal to the number of supported WPAN RATs (e.g., a higher or lower number of WPAN radios may be deployed relative to the number of supported WPAN RATs).

Referring to FIG. 4, the shared WPAN radios 410, 420 and 430 are coupled to a multi-WPAN controller 435. The multi-WPAN controller 435 is configured to enforce prioritized allocation of the shared WPAN radios 410, 420 and 430, as will be described in greater detail below. In an example, the multi-WPAN controller 435 may be implemented as at least one processor which may be coupled to memory (e.g., part of processor 205 and memory 210 as described above with respect to FIG. 2).

Figure 5:
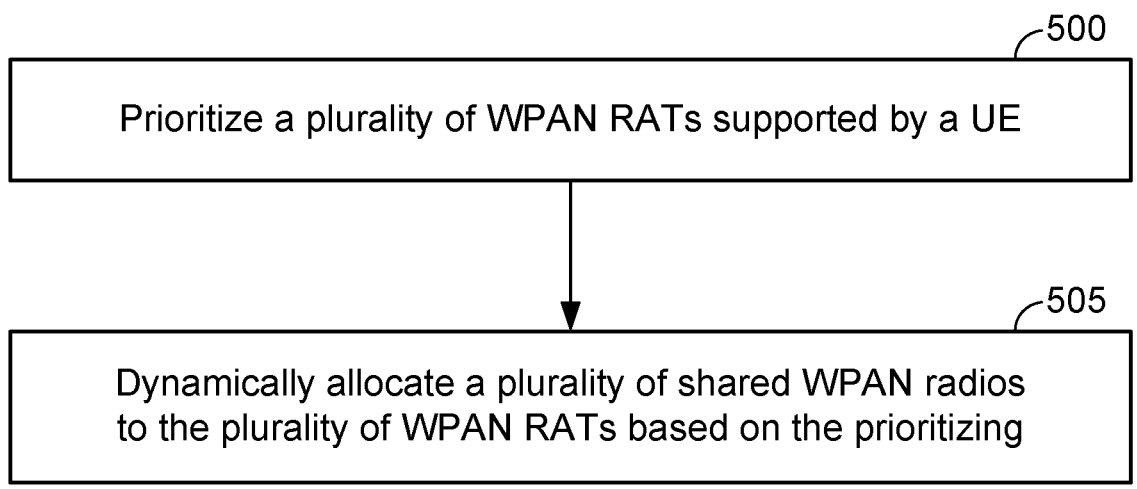
FIG. 5 illustrates a priority-based WPAN radio allocation procedure in accordance with an embodiment of the disclosure.

FIG. 5 illustrates a priority-based WPAN radio allocation procedure in accordance with an embodiment of the disclosure. In an example, the process of FIG. 5 may be performed by the multi-WPAN controller 435 described above with respect to FIG. 4.

Referring to FIG. 5, at block 500, the multi-WPAN controller 435 prioritizes a plurality of WPAN RATs supported by a UE (i.e., a multimodal UE). The prioritization of block 500 may be implemented based on one or more WPAN RAT priority rules. For example, one example WPAN RAT priority rule may establish a default WPAN RAT hierarchy (e.g., a first WPAN RAT such as Bluetooth has a higher ranking or priority than a second WPAN RAT such as Zigbee, etc.). So, when the UE is actively engaged in a Bluetooth session and a Zigbee session, the Bluetooth session takes priority and two WPAN radios may be allocated in support of the Bluetooth session while the Zigbee session is not allocated any WPAN radios (e.g., forcing the Zigbee session to terminate or pause). In another example, the WPAN RAT hierarchy may be used specifically for WPAN RATs with active sessions. So, a low-ranking WPAN RAT with an active session may be allocated a higher priority than a high-ranking WPAN RAT without an active session. However, if the high-ranking WPAN RAT later attempts to establish an active session, the relative priorities may swap and the high-ranking WPAN RAT may "steal" the WPAN radios back from the low-ranking WPAN RAT. In a further example, WPAN RAT priority may be determined in part by session-specific criteria (e.g., if a first WPAN RAT is supporting a voice call, then the first WPAN RAT may be associated with a higher priority than a second WPAN RAT supporting a file-transfer session, etc.). In a further example, a high-ranking WPAN RAT may retain allocation of a WPAN radio even when not engaged in an active session (e.g., for monitoring purposes). In this case, a low-ranking WPAN RAT would not obtain allocation of the WPAN radio even when the low-ranking WPAN RAT is the only WPAN RAT with an active session. Accordingly, there are various ways in which relative priorities among WPAN RATs may be determined at block 500.

Referring to FIG. 5, at block 505, the multi-WPAN controller 435 dynamically allocates a plurality of shared WPAN radios to the plurality of WPAN RATs based on the prioritization. As will be described below in more detail, the dynamic allocation of block 505 may include dividing up the shared WPAN radios evenly among the supported WPAN RATs (e.g., if the relative priorities are equal or substantially equal, or if channel quality is acceptable even there is a priority differential) in a manner that is somewhat similar to operation of the WPAN communications interface 300 of FIG. 3. However, the dynamic allocation of block 505 may alternatively disproportionately allocate the shared WPAN radios in favor of higher-priority WPAN RATs and/or WPAN RATs experiencing poor channel quality.

Figure 6A:
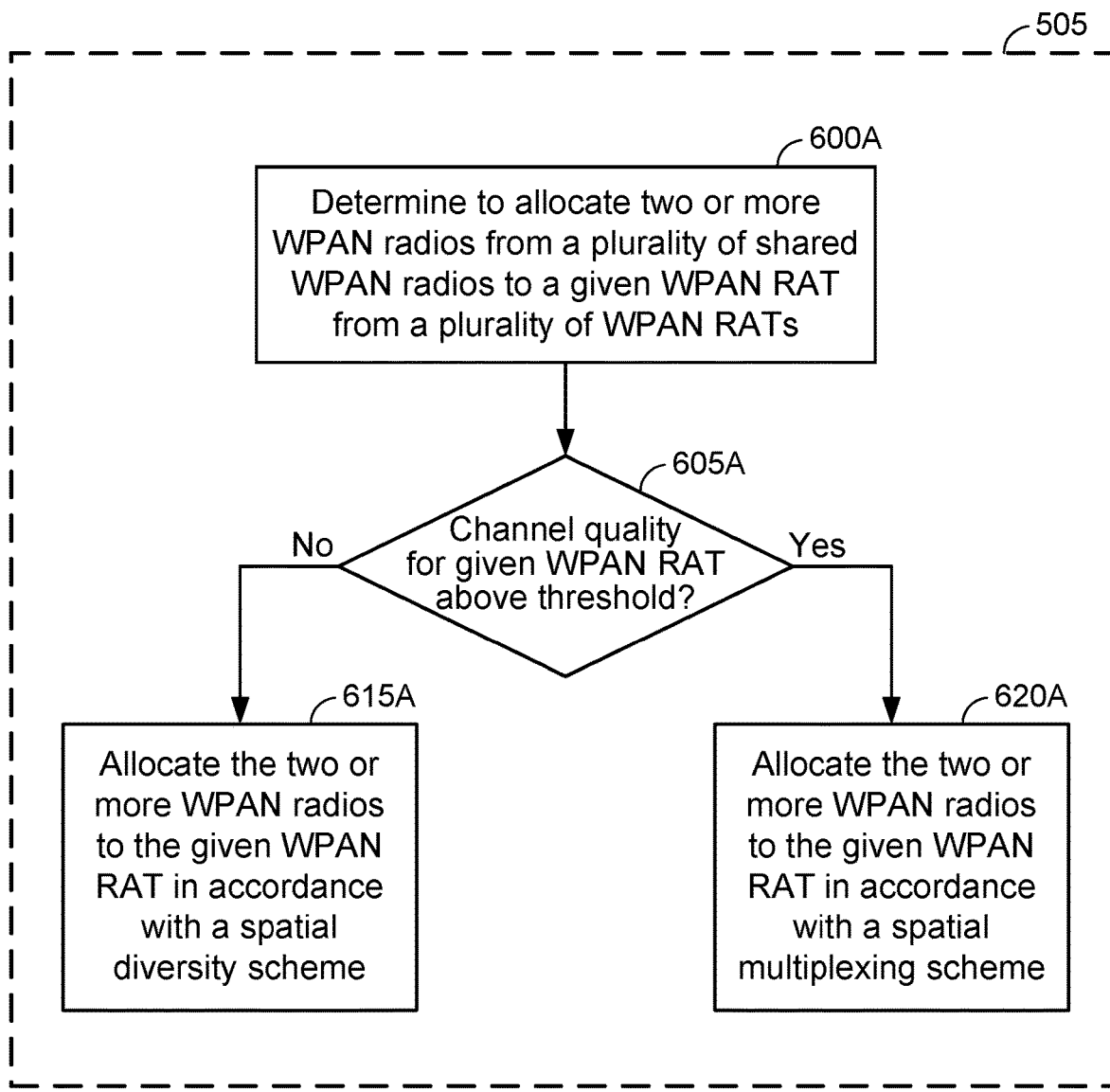
FIG. 6A illustrates an example implementation of a portion of the process of FIG. 5 in accordance with an embodiment of the disclosure.

FIG. 6A illustrates an example implementation of a portion of the process of FIG. 5 in accordance with an embodiment of the disclosure. In particular, FIG. 6A illustrates an example implementation of the dynamic allocation of block 505 of FIG. 5 in more detail.

Referring to FIG. 6A, at block 600A, assume that the multi-WPAN controller 435 determines to allocate two or more WPAN radios from a plurality of shared WPAN radios (e.g., shared WPAN radios 410, 420, and 430) to a given WPAN RAT from a plurality of WPAN RATs. At block 605A, the multi-WPAN controller 435 determines whether a channel quality for the given WPAN RAT is above a threshold. For example, if the given WPAN RAT is engaged in an active session supported by one shared WPAN radio, the channel quality associated with the active session may be determined and compared to the threshold at block 605A. Channel quality metrics that may be evaluated at block 605A include signal-to-noise ratio (SNR), signal-to-interference-plus-noise ratio (SINR), bit error rate (BER), block error rate (BLER), frame error rate (FER), and so on.

Referring to FIG. 6A, if the channel quality is determined not to be above the threshed at block 605A, then the two or more WPAN radios are allocated to the given WPAN RAT in accordance with a spatial diversity scheme at block 615A. In spatial diversity schemes, multiple antennas are used together to transport the same data more reliably. For example, in a receive context, the two or more WPAN radios may be used as a Maximum Ratio Combiner (MRC). In another example, in a transmit context, the two or more WPAN radios may be used to beamform the same data. So, under a spatial diversity scheme, the additional WPAN radio(s) may be allocated to the given WPAN RAT to improve the quality and/or reliability of data traffic being transported without setting up a distinct traffic connection altogether.

Referring to FIG. 6A, if the channel quality is determined to be above the threshed at block 605A, then the two or more WPAN radios are allocated to the given WPAN RAT in accordance with a spatial multiplexing scheme at block 620A. In spatial multiplexing schemes, multiple antennas are used together to transport different via distinct traffic connections. So, if the channel conditions are fairly reliable, spatial multiplexing schemes can be used to increase the overall throughput.

Figure 6B:
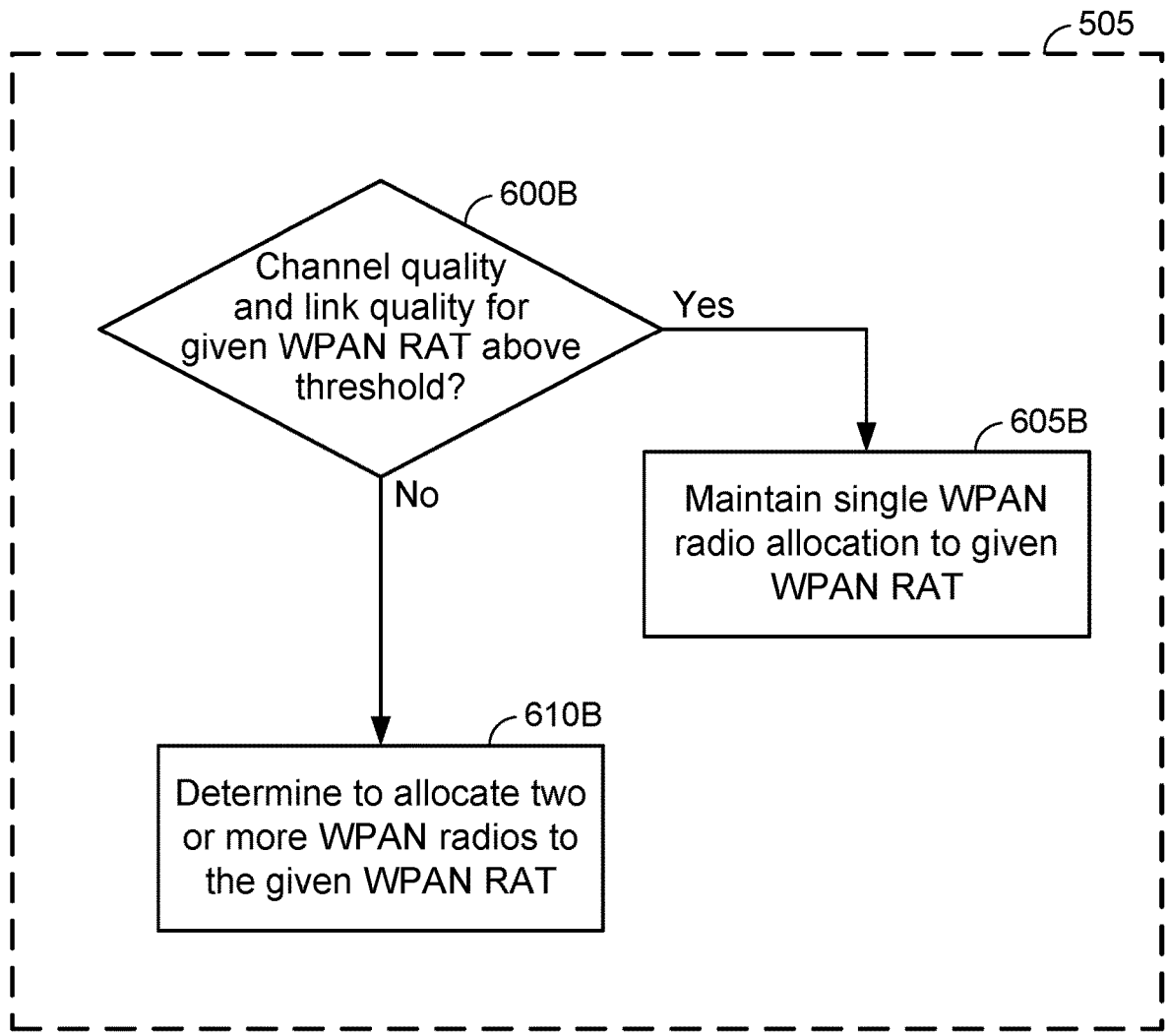
FIG. 6B illustrates an example implementation of a portion of the process of FIG. 5 in accordance with another embodiment of the disclosure.

FIG. 6B illustrates an example implementation of a portion of the process of FIG. 5 in accordance with another embodiment of the disclosure. In particular, FIG. 6B illustrates an example implementation of the dynamic allocation of block 505 of FIG. 5 in more detail.

Referring to FIG. 6B, assume that a given WPAN RAT with a high priority is engaged in an active session while being allocated a single WPAN radio. At block 600B, the multi-WPAN controller 435 determines whether a channel quality and/or session quality for the given WPAN RAT is above a threshold. For an example, if the channel quality is high but the active session requires more bandwidth (e.g., bandwidth not above threshold), another WPAN radio may be helpful to allocate in accordance with a spatial multiplexing scheme. On the other hand, if the channel quality is low (e.g., not above threshold), another WPAN radio may be helpful to allocate in accordance with a spatial diversity scheme.

Referring to FIG. 6B, if the multi-WPAN controller 435 determines that the channel quality and/or the session quality is above the threshold at block 600B, then the multi-WPAN controller 435 maintains the allocation of the single WPAN radio to the given WPAN RAT at block 605B. Otherwise, if the multi-WPAN controller 435 determines that the channel quality and/or the session quality is not above the threshold at block 600B, then the multi-WPAN controller 435 determines to allocate two or more WPAN radios to the given WPAN RAT at block 610B (e.g., at least one additional WPAN radio if the given WPAN RAT is already allocated one WPAN radio). In an example, the determination of block 610B may correspond to block 605A of FIG. 6A, in which case the channel quality is further evaluated to determine whether to deploy the additional WPAN radio(s) in accordance with a spatial diversity scheme or a spatial multiplexing scheme.

Accordingly, FIGS. 6A-6B demonstrate how various session-related quality metrics (e.g., channel quality, session quality, etc.) may factor into whether or not to allocate additional WPAN radio(s) to a high priority WPAN RAT (e.g., as in FIG. 6B), how to allocate additional WPAN radio(s) to a high priority WAPN RAT (e.g., as in FIG. 6A), or both.

Figure 7:
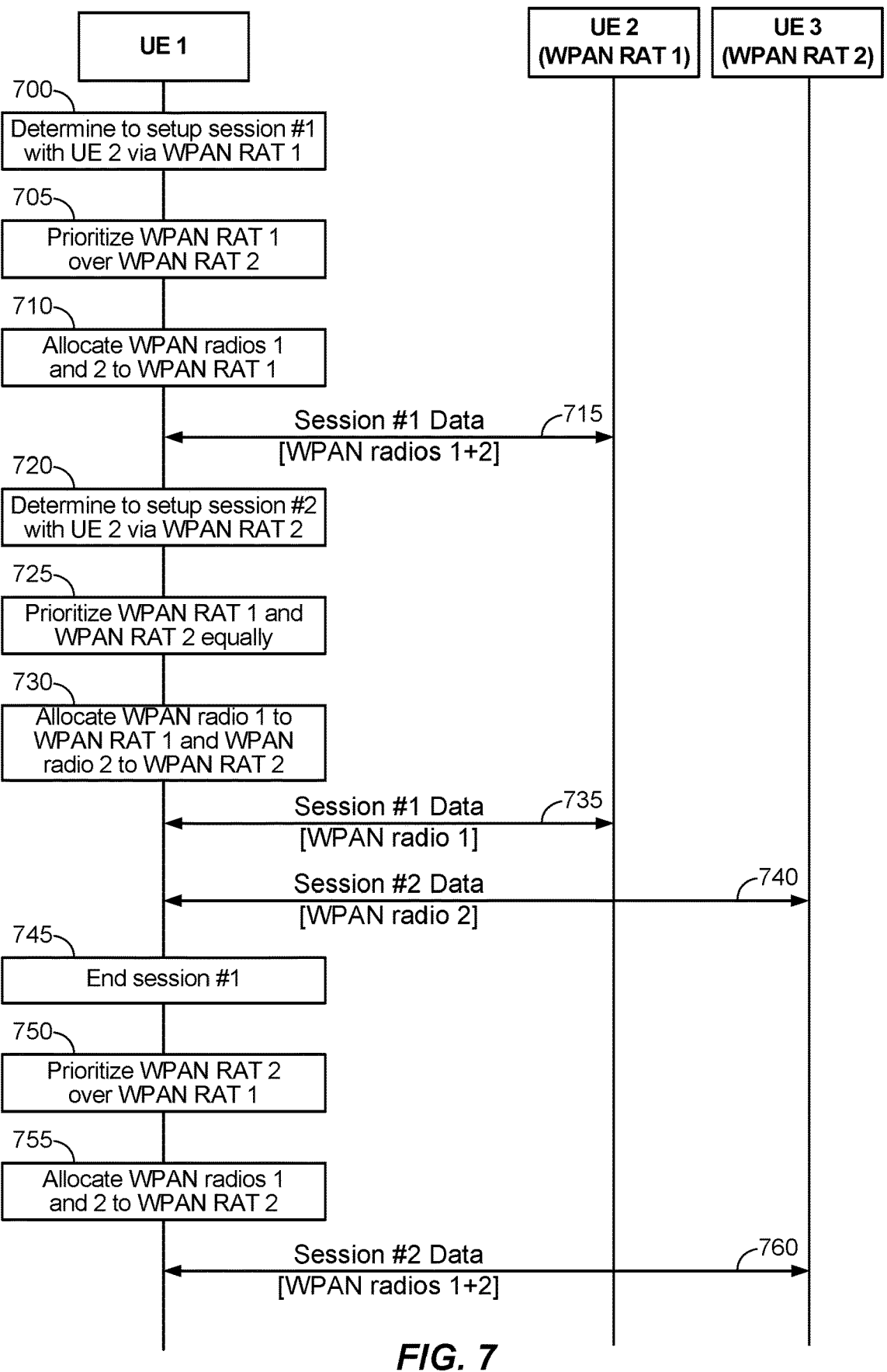
FIG. 7 illustrates an example implementation of the process of FIG. 5 in accordance with an embodiment of the disclosure.

FIG. 7 illustrates an example implementation of the process of FIG. 5 in accordance with an embodiment of the disclosure. More specifically, FIG. 7 relates to an example implementation of a WPAN RAT priority rule where two WPAN RATs have equal prioritization when both are engaged in active WPAN communication sessions. In FIG. 7, UE 1 is configured as a multimodal UE that includes the WPAN communications interface 400 of FIG. 4, while UEs 2 or 3 may or may not be multimodal UEs. So, certain functionality characterized as performed by UE 1 below with respect to FIG. 7 may be implemented by the multi-WPAN controller 435. Moreover, in FIG. 7, for convenience of explanation, the WPAN communications interface 400 is described with respect to two shared WPAN radios (e.g., denoted as WPAN radios 1 and 2) that are dynamically allocated to two WPAN RATs (e.g., denoted as WPAN RAT 1 and WPAN RAT 2). However, it will be appreciated that different numbers of shared WPAN radios and/or WPAN RATs may be used in other embodiments.

Referring to FIG. 7, at block 700, UE 1 determines to setup a first WPAN communication session with UE 2 via WPAN RAT 1. At this point, assume that no other WPAN communication sessions are active. Accordingly, at block 705 (e.g., as in block 500 of FIG. 5), UE 1 prioritizes WPAN RAT 1 over WPAN RAT 2 because WPAN RAT 2 does not have an active WPAN communication session. At block 710 (e.g., as in block 505 of FIG. 5), UE 1 allocates WPAN radios 1 and 2 to WPAN RAT 1 to support the first WPAN communication session based on the prioritization from block 705. At block 715, the first WPAN communication session is setup over WPAN RAT 1 and data traffic is exchanged (e.g., transmitted and/or received) using both WPAN radios 1 and 2 (e.g., based on a spatial diversity scheme or a spatial multiplexing scheme).

At some later point in time while the first WPAN communication session remains active and supported by WPAN radios 1 and 2, at block 720, UE 1 determines to setup a second WPAN communication session with UE 3 via WPAN RAT 2. At block 725 (e.g., as in block 500 of FIG. 5), UE 1 updates the relative WPAN RAT prioritizations based on a WPAN RAT priority rule to prioritize WPAN RATs 1 and 2 equally. At block 730 (e.g., as in block 505 of FIG. 5), UE 1 updates the dynamic allocation of WPAN radios 1 and 2 by allocating WPAN radio 1 to WPAN RAT 1 and allocating WPAN radio 2 to WPAN RAT 2 based on the equal prioritization. At block 735, data traffic is exchanged (e.g., transmitted and/or received) for the first WPAN communication session using WPAN radio 1 only, and at block 740, the second WPAN communication session is setup over WPAN RAT 2 and data traffic is exchanged (e.g., transmitted and/or received) using WPAN radio 2 only.

At some later point in time, at block 745, the first WPAN communication session over WPAN RAT 1 terminates. Accordingly, at block 750 (e.g., as in block 500 of FIG. 5), UE 1 updates the relative WPAN RAT prioritizations to prioritize WPAN RAT 2 over WPAN RAT 1 because WPAN RAT 1 no longer has an active WPAN communication session. At block 755 (e.g., as in block 505 of FIG. 5), UE 1 updates the dynamic allocation of WPAN radios 1 and 2 by allocating both WPANs 1 and 2 to WPAN RAT 2 to support the second WPAN communication session based on the prioritization from block 750. At block 760, data traffic is exchanged (e.g., transmitted and/or received) for the second WPAN communication session using both WPAN radios 1 and 2 (e.g., based on a spatial diversity scheme or a spatial multiplexing scheme).

Figure 8:
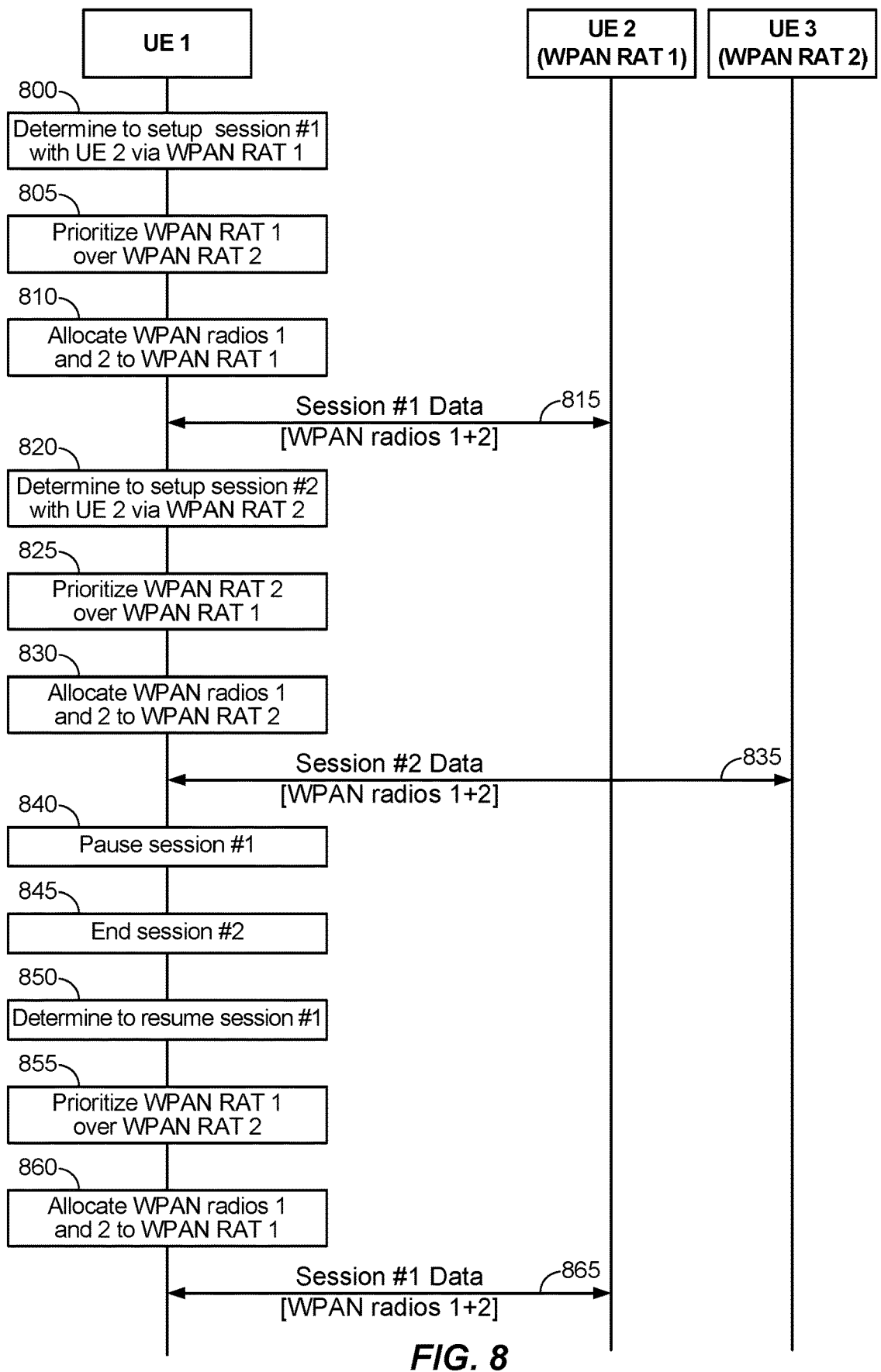
FIG. 8 illustrates an example implementation of the process of FIG. 5 in accordance with an embodiment of the disclosure.

FIG. 8 illustrates an example implementation of the process of FIG. 5 in accordance with an embodiment of the disclosure. More specifically, FIG. 8 relates to an example implementation of a WPAN RAT priority rule where a first WPAN RAT has a higher priority than a second WPAN RAT when both respective WPAN RATs are attempting to engage in active WPAN communication sessions. In FIG. 8, UE 1 is configured as a multimodal UE that includes the WPAN communications interface 400 of FIG. 4, while UEs 2 or 3 may or may not be multimodal UEs. So, certain functionality characterized as performed by UE 1 below with respect to FIG. 8 may be implemented by the multi-WPAN controller 435. Moreover, in FIG. 8, for convenience of explanation, the WPAN communications interface 400 is described with respect to two shared WPAN radios (e.g., denoted as WPAN radios 1 and 2) that are dynamically allocated to two WPAN RATs (e.g., denoted as WPAN RAT 1 and WPAN RAT 2). However, it will be appreciated that different numbers of shared WPAN radios and/or WPAN RATs may be used in other embodiments.

Referring to FIG. 8, at block 800, UE 1 determines to setup a first WPAN communication session with UE 2 via WPAN RAT 1. At this point, assume that no other WPAN communication sessions are active. Accordingly, at block 805 (e.g., as in block 500 of FIG. 5), UE 1 prioritizes WPAN RAT 1 over WPAN RAT 2 because WPAN RAT 2 does not have an active WPAN communication session. At block 810 (e.g., as in block 505 of FIG. 5), UE 1 allocates WPAN radios 1 and 2 to WPAN RAT 1 to support the first WPAN communication session based on the prioritization from block 805. At block 815, the first WPAN communication session is setup over WPAN RAT 1 and data traffic is exchanged (e.g., transmitted and/or received) using both WPAN radios 1 and 2 (e.g., based on a spatial diversity scheme or a spatial multiplexing scheme).

At some later point in time while the first WPAN communication session remains active and supported by WPAN radios 1 and 2, at block 820, UE 1 determines to setup a second WPAN communication session with UE 3 via WPAN RAT 2. At block 825 (e.g., as in block 500 of FIG. 5), UE 1 updates the relative WPAN RAT prioritizations based on a WPAN RAT priority rule to prioritize WPAN RAT 1 over WPAN RAT 2. As discussed above, the WPAN RAT priority rule may be based upon WPAN RAT 1 being higher ranked than WPAN RAT 2 in a default WPAN RAT hierarchy, based on an importance of the second WPAN communication session (e.g., a voice call, etc.), and so on. At block 830 (e.g., as in block 505 of FIG. 5), UE 1 updates the dynamic allocation of WPAN radios 1 and 2 by allocating WPAN radios 1 and 2 to WPAN RAT 2 to support the second WPAN communication session based on the prioritization from block 825. At block 835, the second WPAN communication session is setup over WPAN RAT 2 and data traffic is exchanged (e.g., transmitted and/or received) using both WPAN radios 1 and 2 (e.g., based on a spatial diversity scheme or a spatial multiplexing scheme). Also, at block 840, the first WPAN communication session is paused based on the dynamic allocation of WPAN radios 1 and 2 away from WPAN RAT 1 at block 830.

At some later point in time, at block 845, the second WPAN communication session over WPAN RAT 2 terminates. At block 850 (e.g., as in block 505 of FIG. 5), UE 1 determines to resume the paused first WPAN communication session over WPAN RAT 1, and at block 855 (e.g., as in block 500 of FIG. 5), UE 1 updates the relative WPAN RAT prioritizations to prioritize WPAN RAT 1 over WPAN RAT 2 because WPAN RAT 2 no longer has an active WPAN communication session. At block 860, UE 1 updates the dynamic allocation of WPAN radios 1 and 2 by allocating both WPANs 1 and 2 to WPAN RAT 1 to support the first WPAN communication session based on the prioritization from block 855. At block 865, data traffic is exchanged (e.g., transmitted and/or received) for the first WPAN communication session using both WPAN radios 1 and 2 (e.g., based on a spatial diversity scheme or a spatial multiplexing scheme).

Figure 9:
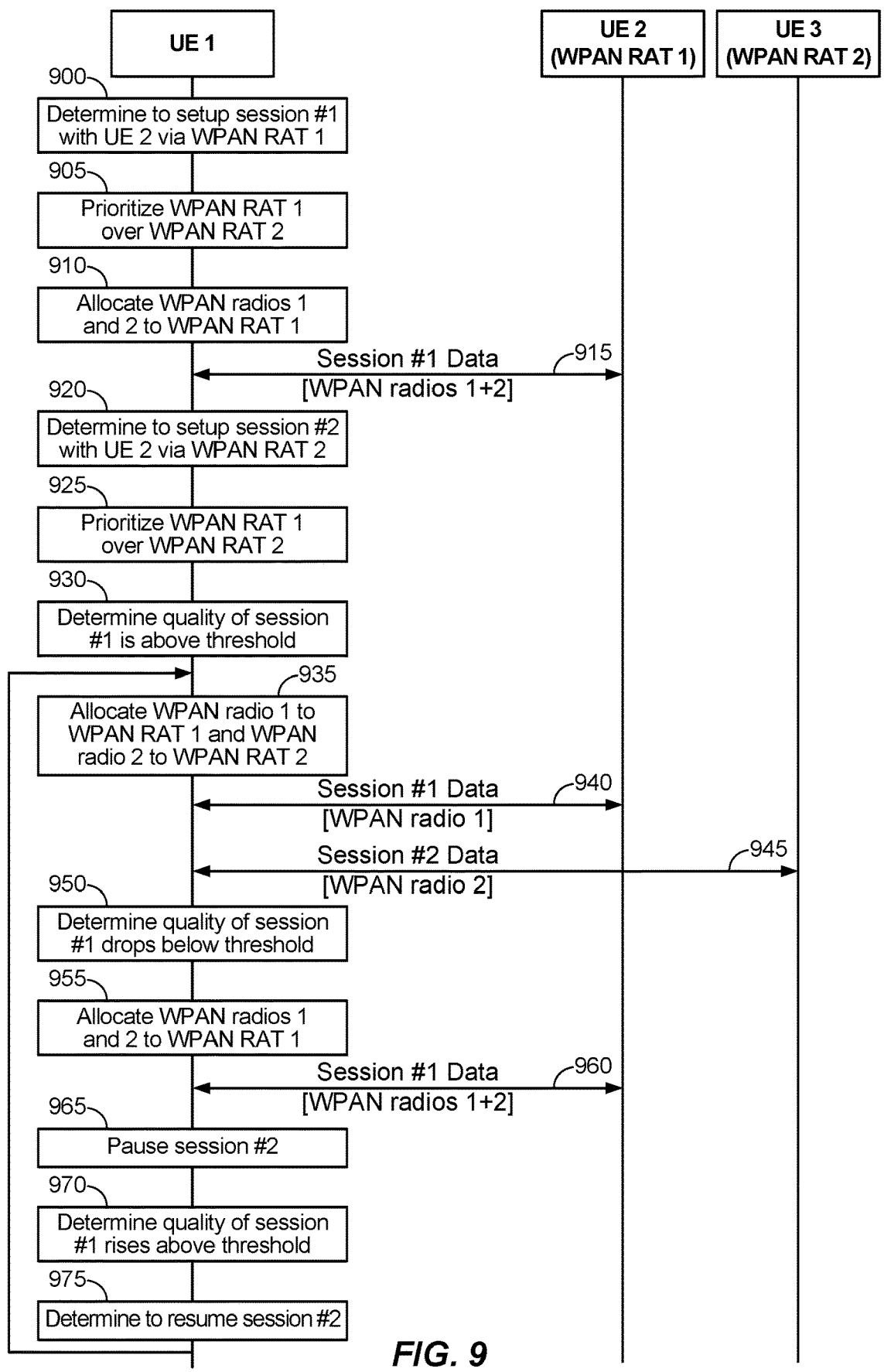
FIG. 9 illustrates an example implementation of the process of FIG. 5 in accordance with an embodiment of the disclosure.

FIG. 9 illustrates an example implementation of the process of FIG. 5 in accordance with an embodiment of the disclosure. More specifically, FIG. 9 relates to an example implementation of a WPAN RAT priority rule where a first WPAN RAT has a higher priority than a second WPAN RAT when both respective WPAN RATs are attempting to engage in active WPAN communication sessions, but the first WPAN RAT is only allocated multiple WPAN radios when experiencing poor channel quality and/or session quality (e.g., as discussed above with respect to FIG. 6B). In FIG. 9, UE 1 is configured as a multimodal UE that includes the WPAN communications interface 400 of FIG. 4, while UEs 2 or 3 may or may not be multimodal UEs. So, certain functionality characterized as performed by UE 1 below with respect to FIG. 9 may be implemented by the multi-WPAN controller 435. Moreover, in FIG. 9, for convenience of explanation, the WPAN communications interface 400 is described with respect to two shared WPAN radios (e.g., denoted as WPAN radios 1 and 2) that are dynamically allocated to two WPAN RATs (e.g., denoted as WPAN RAT 1 and WPAN RAT 2). However, it will be appreciated that different numbers of shared WPAN radios and/or WPAN RATs may be used in other embodiments.

Referring to FIG. 9, at block 900, UE 1 determines to setup a first WPAN communication session with UE 2 via WPAN RAT 1. At this point, assume that no other WPAN communication sessions are active. Accordingly, at block 905 (e.g., as in block 500 of FIG. 5), UE 1 prioritizes WPAN RAT 1 over WPAN RAT 2 because WPAN RAT 2 does not have an active WPAN communication session. At block 910 (e.g., as in block 505 of FIG. 5), UE 1 allocates WPAN radios 1 and 2 to WPAN RAT 1 to support the first WPAN communication session based on the prioritization from block 905. At block 915, the first WPAN communication session is setup over WPAN RAT 1 and data traffic is exchanged (e.g., transmitted and/or received) using both WPAN radios 1 and 2 (e.g., based on a spatial diversity scheme or a spatial multiplexing scheme).

At some later point in time while the first WPAN communication session remains active and supported by WPAN radios 1 and 2, at block 920, UE 1 determines to setup a second WPAN communication session with UE 3 via WPAN RAT 2. At block 925 (e.g., as in block 500 of FIG. 5), UE 1 updates the relative WPAN RAT prioritizations based on a WPAN RAT priority rule to prioritize WPAN RAT 1 over WPAN RAT 2. As discussed above, the WPAN RAT priority rule may be based upon WPAN RAT 1 being higher ranked than WPAN RAT 2 in a default WPAN RAT hierarchy, based on an importance of the second WPAN communication session (e.g., a voice call, etc.), and so on.

Unlike FIG. 8, despite WPAN RAT 1 having a higher priority than WPAN RAT 2, assume that WPAN RAT 1 is allocated both WPAN radios 1 and 2 only when the first WPAN communication session on WPAN RAT 1 is experiencing poor channel quality (e.g., below an SNR threshold, etc.) and/or poor session quality (e.g., below a bandwidth threshold, etc.). At block 930, UE 1 determines the channel quality and/or session quality of the first WPAN communication session is above the relevant threshold(s). Accordingly, at block 935 (e.g., as in block 505 of FIG. 5), UE 1 updates the dynamic allocation of WPAN radios 1 and 2 by allocating WPAN radio 1 to WPAN RAT 1 and allocating WPAN radio 2 to WPAN RAT 2 based on the determination of block 930. At block 940, data traffic is exchanged (e.g., transmitted and/or received) for the first WPAN communication session using WPAN radio 1 only, and at block 945, the second WPAN communication session is setup over WPAN RAT 2 and data traffic is exchanged (e.g., transmitted and/or received) using WPAN radio 2 only.

At some later point in time, at block 950, UE 1 determines the channel quality and/or session quality of the first WPAN communication session is no longer above the relevant threshold(s). At block 955 (e.g., as in block 505 of FIG. 5), UE 1 updates the dynamic allocation of WPAN radios 1 and 2 by allocating WPAN radios 1 and 2 to WPAN RAT 1 to support the first WPAN communication session based on the determination from block 950. At block 960, data traffic is exchanged (e.g., transmitted and/or received) for the first WPAN communication session using both WPAN radios 1 and 2 (e.g., based on a spatial diversity scheme or a spatial multiplexing scheme). Also, at block 965, the second WPAN communication session is paused based on the dynamic allocation of WPAN radios 1 and 2 away from WPAN RAT 2 at block 955.

At some later point in time, at block 970, UE 1 determines the channel quality and/or session quality of the first WPAN communication session is once again above the relevant threshold(s). At block 975 (e.g., as in block 505 of FIG. 5), UE 1 determines to resume the second WPAN communication session based on the determination from block 970, after which the process returns to block 935 where the allocation of WPAN radios 1 and 2 is once again updated to accommodate both WPAN RATs 1 and 2.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE) that is configured to operate in accordance with different wireless personal area network (WPAN) radio access technologies (RATs), comprising:
   prioritizing a plurality of WPAN RATs supported by the UE; and
   dynamically allocating a plurality of shared WPAN radios to the plurality of WPAN RATs based on the prioritizing, each of the plurality of shared WPAN radios being coupled to a respective antenna and configurable so as to support communications over any of the plurality of shared WPAN RATs in accordance with the dynamic allocation.

2. The method of claim 1, wherein the prioritizing assigns a first priority to a first WPAN RAT and a second priority to a second WPAN RAT, the first priority being higher than the second priority.

3. The method of claim 2, wherein the dynamically allocating allocates two or more of the plurality of shared WPAN radios to the first WPAN RAT.

4. The method of claim 3, wherein the dynamically allocating does not allocate any of the plurality of shared WPAN radios to the second WPAN RAT.

5. The method of claim 3, wherein the dynamically allocating allocates the two or more shared WPAN radios to the first WPAN RAT in accordance with a spatial diversity scheme.

6. The method of claim 5,
   wherein the spatial diversity scheme uses the two or more shared WPAN radios as a Maximum Ratio Combiner (MRC) for receiving data traffic over a WPAN communication session, or
   wherein the spatial diversity scheme uses the two or more shared WPAN radios for transmitting data traffic by beamforming the same data traffic over the WPAN communication session, or
   a combination thereof.

7. The method of claim 3, wherein the dynamically allocating allocates the two or more shared WPAN radios to the first WPAN RAT in accordance with a spatial multiplexing scheme for transferring different data traffic over separate connections supported by the two or more shared WPAN radios.

8. The method of claim 2, further comprising:
   determining whether a quality associated with a WPAN communication session on the first WPAN RAT is above a threshold.

9. The method of claim 8,
   wherein the dynamically allocating allocates two or more of the plurality of shared WPAN radios to the first WPAN RAT if the determining determines the quality to be less than or equal to the threshold, and
   wherein the dynamically allocating does not allocate the two or more of the plurality of shared WPAN radios to the first WPAN RAT if the determining determines the quality to be above the threshold.

10. The method of claim 8,
    wherein the dynamically allocating allocates two or more of the plurality of shared WPAN radios to the first WPAN RAT, and
    wherein the dynamically allocating selects between a spatial diversity scheme and a spatial multiplexing scheme for the two or more shared WPAN radios being allocated to the first WPAN RAT based upon the determining.

11. The method of claim 10,
wherein the dynamically allocating selects the spatial diversity scheme if the determining determines the quality to be less than or equal to the threshold, and
wherein the dynamically allocating selects the spatial multiplexing scheme if the determining determines the quality not to be above the threshold.

12. The method of claim 8, wherein the quality corresponds to a channel quality of a channel used to support the WPAN communication session, a session quality of the WPAN communication session, or a combination thereof.

13. The method of claim 1, wherein the prioritizing assigns the same priority to a first WPAN RAT and a second WPAN RAT.

14. The method of claim 13,
wherein the first WPAN RAT has a first active WPAN communication session,
wherein the second WPAN RAT has a second active WPAN communication session,
wherein the dynamically allocating allocates one of the plurality of shared WPAN radios to the first WPAN RAT in support of the first active WPAN communication session and another one of the plurality of shared WPAN radios to the second WPAN RAT in support of the second active WPAN communication session.

15. The method of claim 1,
wherein only one of the plurality of WPAN RATs has an active WPAN communication session, and
wherein the dynamically allocating allocates two or more of the plurality of shared WPAN radios to the WPAN RAT with the active WPAN communication session.

16. A user equipment (UE) that is configured to operate in accordance with different wireless personal area network (WPAN) radio access technologies (RATs), comprising:
means for prioritizing a plurality of WPAN RATs supported by the UE; and
means for dynamically allocating a plurality of shared WPAN radios to the plurality of WPAN RATs based on the prioritization, each of the plurality of shared WPAN radios being coupled to a respective antenna and configurable so as to support communications over any of the plurality of shared WPAN RATs in accordance with the dynamic allocation.

17. The UE of claim 16, wherein the means for prioritizing assigns a first priority to a first WPAN RAT and a second priority to a second WPAN RAT, the first priority being higher than the second priority.

18. The UE of claim 17, wherein the means for dynamically allocating allocates two or more of the plurality of shared WPAN radios to the first WPAN RAT.

19. The UE of claim 18, wherein the means for dynamically allocating does not allocate any of the plurality of shared WPAN radios to the second WPAN RAT.

20. The UE of claim 18, wherein the means for dynamically allocating allocates the two or more shared WPAN radios to the first WPAN RAT in accordance with a spatial diversity scheme.

21. The UE of claim 20,
wherein the spatial diversity scheme uses the two or more shared WPAN radios as a Maximum Ratio Combiner (MRC) for receiving data traffic over a WPAN communication session, or
wherein the spatial diversity scheme uses the two or more shared WPAN radios for transmitting data traffic by beamforming the same data traffic over the WPAN communication session, or
a combination thereof.

22. The UE of claim 18, wherein the means for dynamically allocating allocates the two or more shared WPAN radios to the first WPAN RAT in accordance with a spatial multiplexing scheme for transferring different data traffic over separate connections supported by the two or more shared WPAN radios.

23. The UE of claim 17, further comprising:
means for determining whether a quality associated with a WPAN communication session on the first WPAN RAT is above a threshold.

24. The UE of claim 23,
wherein the means for dynamically allocating allocates two or more of the plurality of shared WPAN radios to the first WPAN RAT if the means for determining determines the quality to be less than or equal to the threshold, and
wherein the means for dynamically allocating does not allocate the two or more of the plurality of shared WPAN radios to the first WPAN RAT if the means for determining determines the quality to be above the threshold.

25. The UE of claim 23,
wherein the means for dynamically allocating allocates two or more of the plurality of shared WPAN radios to the first WPAN RAT, and
wherein the means for dynamically allocating selects between a spatial diversity scheme and a spatial multiplexing scheme for the two or more shared WPAN radios being allocated to the first WPAN RAT based upon the determination.

26. The UE of claim 25,
wherein the means for dynamically allocating selects the spatial diversity scheme if the means for determining determines the quality to be less than or equal to the threshold, and
wherein the means for dynamically allocating selects the spatial multiplexing scheme if the means for determining determines the quality not to be above the threshold.

27. The UE of claim 23, wherein the quality corresponds to a channel quality of a channel used to support the WPAN communication session, a session quality of the WPAN communication session, or a combination thereof.

28. The UE of claim 16, wherein the means for prioritizing assigns the same priority to a first WPAN RAT and a second WPAN RAT.

29. The UE of claim 28,
wherein the first WPAN RAT has a first active WPAN communication session,
wherein the second WPAN RAT has a second active WPAN communication session,
wherein the means for dynamically allocating allocates one of the plurality of shared WPAN radios to the first WPAN RAT in support of the first active WPAN communication session and another one of the plurality of shared WPAN radios to the second WPAN RAT in support of the second active WPAN communication session.

30. The UE of claim 16,
wherein only one of the plurality of WPAN RATs has an active WPAN communication session, and
wherein the means for dynamically allocating allocates two or more of the plurality of shared WPAN radios to the WPAN RAT with the active WPAN communication session.

31. A user equipment (UE) that is configured to operate in accordance with different wireless personal area network (WPAN) radio access technologies (RATs), comprising:
a memory; and
at least one processor coupled to the memory and configured to:
prioritize a plurality of WPAN RATs supported by the UE; and
dynamically allocate a plurality of shared WPAN radios to the plurality of WPAN RATs based on the prioritization, each of the plurality of shared WPAN radios being coupled to a respective antenna and configurable so as to support communications over any of the plurality of shared WPAN RATs in accordance with the dynamic allocation.

32. The UE of claim 31, wherein the at least one processor assigns a first priority to a first WPAN RAT and a second priority to a second WPAN RAT, the first priority being higher than the second priority.

33. The UE of claim 32, wherein the at least one processor allocates two or more of the plurality of shared WPAN radios to the first WPAN RAT.

34. The UE of claim 33, wherein the at least one processor does not allocate any of the plurality of shared WPAN radios to the second WPAN RAT.

35. The UE of claim 33, wherein the at least one processor allocates the two or more shared WPAN radios to the first WPAN RAT in accordance with a spatial diversity scheme.

36. The UE of claim 35,
wherein the spatial diversity scheme uses the two or more shared WPAN radios as a Maximum Ratio Combiner (MRC) for receiving data traffic over a WPAN communication session, or
wherein the spatial diversity scheme uses the two or more shared WPAN radios for transmitting data traffic by beamforming the same data traffic over the WPAN communication session, or
a combination thereof.

37. The UE of claim 33, wherein the at least one processor allocates the two or more shared WPAN radios to the first WPAN RAT in accordance with a spatial multiplexing scheme for transferring different data traffic over separate connections supported by the two or more shared WPAN radios.

38. The UE of claim 32, wherein the at least one processor is further configured to determine whether a quality associated with a WPAN communication session on the first WPAN RAT is above a threshold.

39. The UE of claim 38,
wherein the at least one processor allocates two or more of the plurality of shared WPAN radios to the first WPAN RAT if the at least one processor determines the quality to be less than or equal to the threshold, and
wherein the at least one processor does not allocate the two or more of the plurality of shared WPAN radios to the first WPAN RAT if the at least one processor determines the quality to be above the threshold.

40. The UE of claim 38,
wherein the at least one processor allocates two or more of the plurality of shared WPAN radios to the first WPAN RAT, and
wherein the at least one processor selects between a spatial diversity scheme and a spatial multiplexing scheme for the two or more shared WPAN radios being allocated to the first WPAN RAT based upon the determination.

41. The UE of claim 40,
wherein the at least one processor selects the spatial diversity scheme if the at least one processor determines the quality to be less than or equal to the threshold, and
wherein the at least one processor selects the spatial multiplexing scheme if the at least one processor determines the quality not to be above the threshold.

42. The UE of claim 38, wherein the quality corresponds to a channel quality of a channel used to support the WPAN communication session, a session quality of the WPAN communication session, or a combination thereof.

43. The UE of claim 31, wherein the at least one processor assigns the same priority to a first WPAN RAT and a second WPAN RAT.

44. The UE of claim 43,
wherein the first WPAN RAT has a first active WPAN communication session,
wherein the second WPAN RAT has a second active WPAN communication session,
wherein the at least one processor allocates one of the plurality of shared WPAN radios to the first WPAN RAT in support of the first active WPAN communication session and another one of the plurality of shared WPAN radios to the second WPAN RAT in support of the second active WPAN communication session.

45. The UE of claim 31,
wherein only one of the plurality of WPAN RATs has an active WPAN communication session, and
wherein the at least one processor allocates two or more of the plurality of shared WPAN radios to the WPAN RAT with the active WPAN communication session.

46. A non-transitory computer-readable medium containing instructions stored thereon, which, when executed by a user equipment (UE) that is configured to operate in accordance with different wireless personal area network (WPAN) radio access technologies (RATs), causes the UE to perform operations, the instructions comprising:
at least one instruction configured to cause the UE to prioritize a plurality of WPAN RATs supported by the UE; and
at least one instruction configured to cause the UE to dynamically allocate a plurality of shared WPAN radios to the plurality of WPAN RATs based on the prioritization, each of the plurality of shared WPAN radios being coupled to a respective antenna and configurable so as to support communications over any of the plurality of shared WPAN RATs in accordance with the dynamic allocation.

47. The non-transitory computer-readable medium of claim 46, wherein the at least one instruction configured to cause the UE to prioritize is configured to cause the UE to assign a first priority to a first WPAN RAT and a second priority to a second WPAN RAT, the first priority being higher than the second priority.

48. The non-transitory computer-readable medium of claim 47, wherein the at least one instruction configured to cause the UE to dynamically allocate is configured to cause the UE to allocate two or more of the plurality of shared WPAN radios to the first WPAN RAT.

49. The non-transitory computer-readable medium of claim 48, wherein the at least one instruction configured to cause the UE to dynamically allocate is configured to cause the UE not to allocate any of the plurality of shared WPAN radios to the second WPAN RAT.

50. The non-transitory computer-readable medium of claim 48, wherein the at least one instruction configured to cause the UE to dynamically allocate is configured to cause the UE to allocate the two or more shared WPAN radios to the first WPAN RAT in accordance with a spatial diversity scheme.

51. The non-transitory computer-readable medium of claim 50,
   wherein the spatial diversity scheme uses the two or more shared WPAN radios as a Maximum Ratio Combiner (MRC) for receiving data traffic over a WPAN communication session, or
   wherein the spatial diversity scheme uses the two or more shared WPAN radios for transmitting data traffic by beamforming the same data traffic over the WPAN communication session, or
   a combination thereof.

52. The non-transitory computer-readable medium of claim 48, wherein the at least one instruction configured to cause the UE to dynamically allocate is configured to cause the UE to allocate the two or more shared WPAN radios to the first WPAN RAT in accordance with a spatial multiplexing scheme for transferring different data traffic over separate connections supported by the two or more shared WPAN radios.

53. The non-transitory computer-readable medium of claim 47, further comprising:
   at least one instruction configured to cause the UE to determine whether a quality associated with a WPAN communication session on the first WPAN RAT is above a threshold.

54. The non-transitory computer-readable medium of claim 53,
   wherein the at least one instruction configured to cause the UE to dynamically allocate is configured to cause the UE to allocate two or more of the plurality of shared WPAN radios to the first WPAN RAT if the at least one instruction configured to cause the UE to determine causes the UE to determine the quality to be less than or equal to the threshold, and
   wherein the at least one instruction configured to cause the UE to dynamically allocate is configured to cause the UE not to allocate the two or more of the plurality of shared WPAN radios to the first WPAN RAT if the at least one instruction configured to cause the UE to determine causes the UE to determine the quality to be above the threshold.

55. The non-transitory computer-readable medium of claim 53,
   wherein the at least one instruction configured to cause the UE to dynamically allocate is configured to cause the UE to allocate two or more of the plurality of shared WPAN radios to the first WPAN RAT, and
   wherein the at least one instruction configured to cause the UE to dynamically allocate is configured to cause the UE to select between a spatial diversity scheme and a spatial multiplexing scheme for the two or more shared WPAN radios being allocated to the first WPAN RAT based upon the determination.

56. The non-transitory computer-readable medium of claim 55,
   wherein the at least one instruction configured to cause the UE to dynamically allocate is configured to cause the UE to select the spatial diversity scheme the at least one instruction configured to cause the UE to determine causes the UE to determine the quality to be less than or equal to the threshold, and
   wherein the at least one instruction configured to cause the UE to dynamically allocate is configured to cause the UE to select the spatial multiplexing scheme if the at least one instruction configured to cause the UE to determine causes the UE to determine the quality not to be above the threshold.

57. The non-transitory computer-readable medium of claim 53, wherein the quality corresponds to a channel quality of a channel used to support the WPAN communication session, a session quality of the WPAN communication session, or a combination thereof.

58. The non-transitory computer-readable medium of claim 46, wherein the at least one instruction configured to cause the UE to prioritize is configured to cause the UE to assign the same priority to a first WPAN RAT and a second WPAN RAT.

59. The non-transitory computer-readable medium of claim 58,
   wherein the first WPAN RAT has a first active WPAN communication session,
   wherein the second WPAN RAT has a second active WPAN communication session,
   wherein the at least one instruction configured to cause the UE to dynamically allocate is configured to cause the UE to allocate one of the plurality of shared WPAN radios to the first WPAN RAT in support of the first active WPAN communication session and another one of the plurality of shared WPAN radios to the second WPAN RAT in support of the second active WPAN communication session.

60. The non-transitory computer-readable medium of claim 46,
   wherein only one of the plurality of WPAN RATs has an active WPAN communication session, and
   wherein the at least one instruction configured to cause the UE to dynamically allocate is configured to cause the UE to allocate two or more of the plurality of shared WPAN radios to the WPAN RAT with the active WPAN communication session.

* * * * *